United States Patent [19]

Tilton et al.

[11] Patent Number: 5,327,269
[45] Date of Patent: Jul. 5, 1994

[54] FAST SWITCHING 270° TWISTED NEMATIC LIQUID CRYSTAL DEVICE AND EYEWEAR INCORPORATING THE DEVICE

[75] Inventors: Mary Tilton, Jefferson, Wis.; Lenny Lipton, Greenbrae, Calif.

[73] Assignee: Standish Industries, Inc., Lake Mills, Wis.

[21] Appl. No.: 882,586

[22] Filed: May 13, 1992

[51] Int. Cl.$^5$ .................. G02F 1/1335; G02F 1/13; G02F 1/1333
[52] U.S. Cl. .................. 359/63; 359/102; 359/83
[58] Field of Search .................. 359/78, 83, 102, 466, 359/63

[56] References Cited

U.S. PATENT DOCUMENTS

| | | | |
|---|---|---|---|
| 4,084,884 | 4/1978 | Raynes | 350/334 |
| 4,143,947 | 3/1979 | Aftergut et al. | 350/334 |
| 4,566,758 | 1/1986 | Bos | 350/346 |
| 4,697,884 | 10/1987 | Amstutz et al. | 359/102 |
| 4,779,960 | 10/1988 | Kozaki et al. | 359/102 |
| 4,870,486 | 9/1989 | Nakagawa et al. | 359/63 |
| 5,187,603 | 2/1993 | Bos | 359/93 |

FOREIGN PATENT DOCUMENTS

| | | | |
|---|---|---|---|
| 62-153821 | 7/1987 | Japan | 359/102 |
| 63-6524 | 1/1988 | Japan | 359/102 |

OTHER PUBLICATIONS

R. L. Hubbard & P. J. Box, "Optical-Bounce Removal and Turnoff-Time Reduction in Twisted-Nematic Displays," *IEEE Transactions on Electron Devices*, vol. ED-28, No. 6, Jun. 1981, pp. 723-725.

*Primary Examiner*—William L. Sikes
*Assistant Examiner*—Roy Trice
*Attorney, Agent, or Firm*—Limbach & Limbach

[57] ABSTRACT

A fast switching liquid crystal device, a method for making such a device, and eyewear incorporating the device for use in a stereoscopic viewing system. The device achieves a fast response time and high contrast by increasing the twist of the nematic material to 270 degrees and orienting the tilt angle of the material to be consistent throughout the twist. The liquid crystal device is constructed to have two transparent, essentially parallel substrates which are spaced apart by a desired cell gap distance, and on which are deposited electrodes. The electrode surfaces are coated with a polymer material which is conditioned to provide a means of aligning the director axes of the liquid crystal material, and to maintain a desired tilt angle between the director axes and the electrode surfaces. A chiral dopant is added to the nematic liquid crystal material so that the pitch of the material is approximately twice the gap distance of the cell. Polarizing filters are placed on the exterior surfaces of the substrates and are oriented to be either parallel or perpendicular to the direction of conditioning of the polymer coated electrode surfaces, and to be perpendicular to each other.

16 Claims, 3 Drawing Sheets

FAST SWITCHING 270° TWISTED NEMATIC LIQUID CRYSTAL DEVICE AND EYEWEAR INCORPORATING THE DEVICE

TECHNICAL FIELD

The present invention is directed to a fast switching liquid crystal display device, to a method of making such a device, and to eyewear incorporating the device for use in a stereoscopic viewing system.

BACKGROUND OF THE INVENTION

Liquid crystal devices are frequently used for displays because of their ability to selectively transmit or block light depending on its polarization. The electro-optic effects of such devices also allow them to be used in shuttering applications where it is desired to pass or block light depending on the operational characteristics of the viewing system in which they are incorporated.

Liquid crystal devices composed of twisted nematic liquid crystal materials have received much attention as candidates for displays and shutters. These devices are produced by fabricating a liquid crystal cell and positioning it between optical polarizing filters. The cell contains a layer of nematic liquid crystal material sandwiched between a pair of parallel transparent plates.

The surfaces of the plates in contact with the liquid crystal material are coated in select areas with a transparent conducting material, forming an electrode on each surface. The surfaces of the electrodes in contact with the liquid crystal material are conditioned so that they impart a preferential alignment to the director axes of the material. If the plates are aligned so that their respective preferred directions are orthogonal, the liquid crystal material will assume a twisted structure in the interior of the cell, that is the director axis of the material will follow a helix as it progresses through the layer of liquid crystal material.

When an electrical potential is applied between the electrodes, the nematic structure of the liquid crystal material rotates or untwists. Light propagating within the cell has its plane of polarization altered to a degree depending upon whether the material is in its twisted or untwisted state. The polarizing filters on either side of the cell determine whether light is transmitted through the cell or blocked, depending upon their relative orientation, and the state (twisted or untwisted) of the liquid crystal material within the cell.

It is known that the time required for the liquid crystal material in the cell to become aligned or activated is a function of the magnitude of the electrical potential applied between the electrodes. The decay or relaxation time for the material is dependent upon the characteristics of the nematic material used in the cell. The magnitudes of the alignment and relaxation times become important where the time required for the state change of the material (from transmissive to opaque or vice-a-versa) determines its usefulness for a particular application.

Shuttering applications, such as those found in stereoscopic viewing systems, require that the cell have a fast response time, wherein the cell is dark (opaque) in one state, and transmissive (transparent) in the other. The prior art discusses attempts to decrease cell response times and to improve the contrast between the light transmissive and light blocking states.

Aftergut et al., in U.S. Pat. No. 4,143,947, teaches how to reduce the decay (relaxation) time in a 90 degree twisted nematic cell by adding a controlled amount of an optically active material (such as a cholesteric material) to the nematic liquid crystal material in the cell. Aftergut also indicates that a cell constructed so that the liquid crystal material (with the optically active additive) assumes a 270 degree twist in its structure realizes a further decrease in the decay time. However, a cell constructed according to the invention of Aftergut will have nonuniformities in image texture upon switching due to the tilt of the liquid crystal material director axes relative to the electrode surfaces of the cell.

Raynes, in U.S. Pat. No. 4,084,884, teaches that the sense of tilt of the director axes of the liquid crystal material at the electrode surfaces must be compatible with the direction of twist of the helical structure of the nematic material within the cell, in order to avoid nonuniform textures upon activation. Thus the tilt of the nematic material impacts the display characteristics of the cell, and its utility in shuttering applications, as they depend upon the contrast in transmissiveness which is achieved between the activated and relaxed states of the cell.

Bos, in U.S. Pat. No. 4,566,758, teaches how to fabricate a fast optical shutter having a reduced response time. The liquid crystal cell in Bos is a pi ($\pi$) cell, in which the transparent plates are oriented antiparallel to each other. The switching between the cell states is fast because the motion of the liquid crystal material is limited.

A problem with the type of cell disclosed in Bos is that in production, surface defects show up as defects in the shutter capability because most of the switching behavior occurs near the plate surface. In addition, this type of cell uses a bias voltage which is applied in the "off" state to inhibit the relaxation of the cell material and to provide a neutral colored cell. The use of a bias voltage is undesirable in some applications owing to power restrictions or circuit complexity considerations. The invention of Bos also requires a tilt angle at the plate surfaces which is difficult to achieve in mass production.

What is desired is a liquid crystal device suitable for use as an optical shutter which has a fast response time, optimizes the contrast between the two cell states, does not require a bias voltage, and can be easily fabricated from standard materials by existing production methods.

SUMMARY OF THE INVENTION

The present invention is directed to a liquid crystal device which can be used as an optical shutter, to a method for making such a device, and to eyewear incorporating the device for use in a stereoscopic viewing system. The device achieves a fast response time and high contrast by increasing the twist of the nematic material to 270 degrees and orienting the tilt angle of the material to be consistent throughout the twist. The present invention is easily made by currently available production methods and does not require the application of a bias voltage to the device in its transmissive "off" state.

A liquid crystal cell in accordance with the present invention is constructed to have two essentially parallel substrates spaced apart by a desired cell gap distance. The inside surfaces of the substrates have a transparent, conductive coating deposited on them. The conductive coating forms an electrode which may be patterned for use in display purposes, or may cover the entire surface for use in shuttering applications. The electrode surfaces are coated with a polymer material which is conditioned to provide a means of aligning the director axes of the liquid crystal material, and to maintain a desired tilt angle between the director axes and the electrode surfaces.

A chiral dopant is added to the nematic liquid crystal material so that the pitch of the material (the distance over which it twists by 360 degrees) is approximately twice the gap distance of the cell. The sense of the twist of the nematic material is such that the tilt angle between the director axis of the material and the electrode surfaces is naturally followed throughout the liquid crystal material layer. The naturally twisted, slightly tilted structure avoids nonuniform textures at the substrate surfaces when the cell is switched.

Polarizing filters are placed on the exterior surfaces of the substrates and are oriented to be either parallel or perpendicular to the direction of conditioning of the polymer coated electrode surfaces, and either parallel or perpendicular to each other. The preferred mode is one in which the polarizers are aligned perpendicular to each other.

No voltage is applied to the device in its transmissive "off" state, and a high voltage is applied to the device to cause its liquid crystal material to untwist, and thereby enter an opaque state. High voltage of one magnitude (i.e. a positive voltage) can be applied to drive the device into its opaque state, or an alternating driving voltage can be applied (where the high voltage alternately assumes positive and negative values). The advantage of an alternating driving voltage scheme is that it reduces charge build-up on the electrodes. This is important because long term charge build up can degrade the electrodes by causing electroplating. When constructed of the preferred materials and in accordance with the disclosed structure, the device can be driven at a voltage of 15 V with an activation time of less than 1 millisecond (msec), and with a decay or relaxation time of 3 msec.

The present invention is intended for use in fast optical switching shutter devices, stereoscopic viewing glasses, or fast switching information displays. Further objects and advantages of the present invention will become apparent from the following detailed description and accompanying drawings.

DETAILED DESCRIPTION OF THE PREFERRED EMBODIMENT

Figure 1:
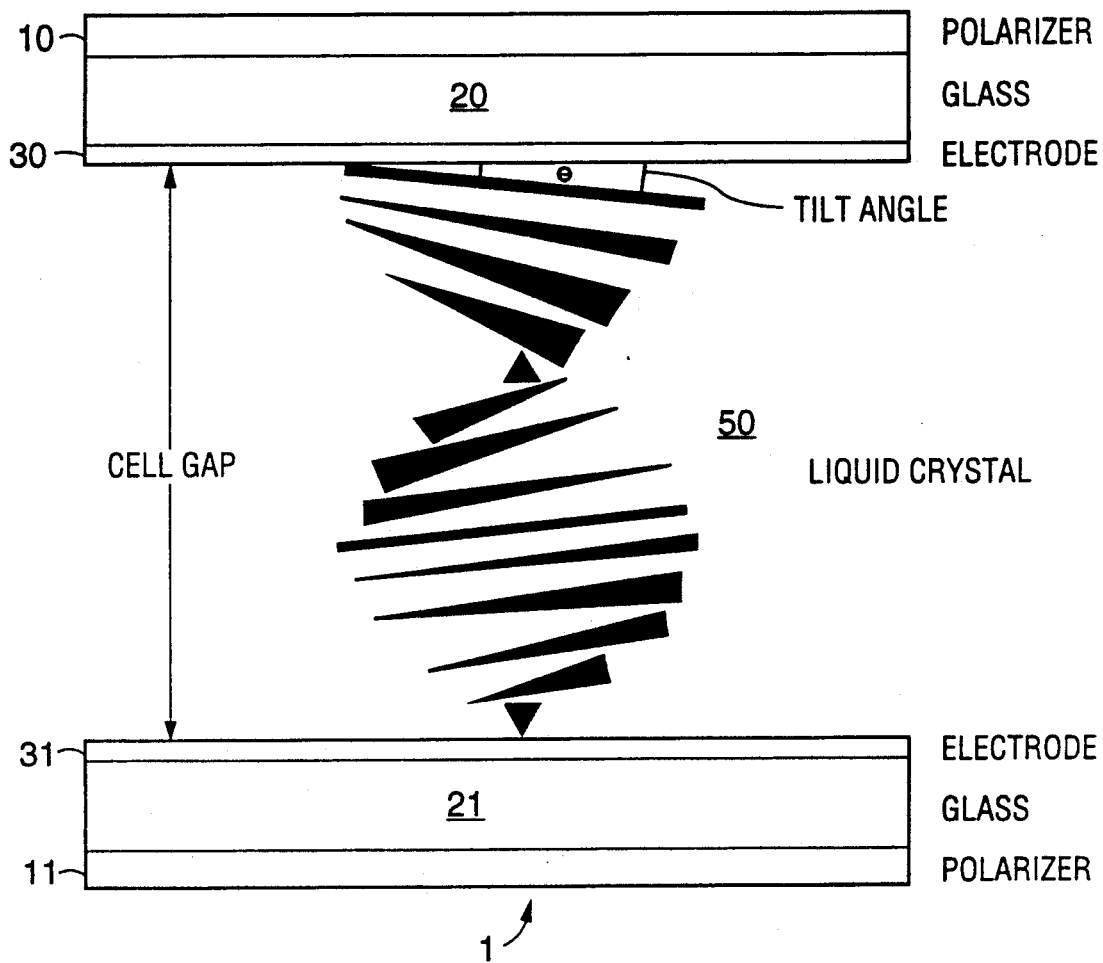
FIG. 1 shows the structure and elements of a liquid crystal cell of the present invention.

Referring to the figures, and in particular to FIG. 1, there is shown a liquid crystal cell 1 constructed in accordance with the present invention. The cell 1 has two essentially parallel substrates 20 and 21, spaced a distance d apart, where d is referred to as the "cell gap" in FIG. 1. The substrates 20 and 21 are transparent and are typically made of glass.

On the interior surface of each substrate is deposited a transparent, conductive coating so as to form electrodes 30 and 31. The electrodes 30 and 31 may be patterned to form an image when the cell 1 is used for display purposes, or the electrodes may cover essentially the entire interior surface of the substrates 20 and 21 when the cell 1 is used as an optical shutter. A preferred material for electrodes 30 and 31 is indium tin oxide.

The surfaces of electrodes 30 and 31 are conditioned so that the director axis of the nematic liquid crystal material 50 introduced into the cell 1 will align itself With the preferred direction imparted to the interior surfaces. The electrodes 30 and 31 are conditioned so that their preferred alignment directions are perpendicular to each other, thus imparting a twisted or helical structure to the liquid crystal material 50, as defined by the position of the director axis of the material.

A typical method for conditioning the surfaces of electrodes 30 and 31 is to coat them with a polymer material after they have been deposited on the interior surfaces of substrates 20 and 21. The preferred polymer coating is a polyimide. Each polymer coating is rubbed by a method known in the art to impart a preferred alignment direction to the liquid crystal material 50 when the liquid crystal material is introduced into the cell 1. The conditioning of the electrode surfaces can also be achieved by depositing silicon monoxide (SiO) in a manner known in the art onto electrodes 30 and 31 at a deposition angle selected to produce the desired results (in terms of the tilt angle described below).

The conditioning of inner surfaces of electrodes 30 and 31 also imparts a tilt angle between the director axis of the liquid crystal material 50 and the plane of the electrodes, denoted by Θ in FIG. 1. The existence of the tilt angle is a well-known effect, though it is not fully understood at this time. For ease of manufacture, the desired tilt angle, Θ, is less than or equal to 5 degrees. The polyimide used to coat electrodes 30 and 31 is chosen (usually by experimentation) so as to achieve the desired tilt angle.

A nematic liquid crystal material 50 is introduced in the space between electrodes 30 and 31, filling the cell gap. A chiral dopant (an optically active additive) is added to the nematic liquid crystal material 50 in sufficient quantity so that the pitch (the distance over which the liquid crystal twists by 360 degrees) is between one and two times the cell gap distance. The sense of the twist of the liquid crystal material 50 is such that the tilt angle of the material's director axis with respect to the plane of the electrodes, Θ, is followed throughout the layer of material. This means that the tilt angle, Θ, at the surfaces of electrodes 30 and 31 is maintained along the entire helical structure of the liquid crystal material 50.

Polarizing filters 10 and 11 are placed on the exterior surfaces of substrates 20 and 21. The filters 10 and 11 are oriented to be either parallel or perpendicular to the direction in which the electrode surfaces have been conditioned (the direction in which the director axes are aligned at the electrode surface), and either parallel or perpendicular to each other. The preferred mode is one in which the polarizers are perpendicular to each other, making the off or relaxed cell state transmissive, and the activated state opaque.

In operation, a potential difference is applied between electrodes 30 and 31 (by means not shown). If the voltage is increased slowly, a textured state occurs at intermediate voltage levels. The normal driving method is to use a voltage above which the textured states are formed, thereby bypassing the textured state. The cell 1 then switches between a bright (transparent) state at 0 volts and an opaque, activated state at a higher voltage, typically 15 volts rms.

The operation of the device of the present invention is as follows. Light passing through one polarizer is plane polarized (by a first one of polarizers 10 and 11) as it enters the liquid crystal layer between the cell gap. As the light propagates through the liquid crystal layer, its plane of polarization is rotated as it follows the twist imparted to the nematic liquid crystal material. In the preferred embodiment, the twist of the material is 270 degrees. When the light emerges from the liquid crystal layer, its plane of polarization is oriented perpendicularly to the direction it had prior to entering the liquid crystal layer. The second polarizing filter is oriented perpendicularly to the orientation of the first filter, allowing the light to pass through to the outside of the cell. This represents the relaxed (off) state of the cell.

When the cell is activated at a sufficiently high voltage, the liquid crystal material untwists and the plane of polarization of the light entering the liquid crystal material is not rotated, propagating through the cell gap essentially unaltered. When the light encounters the second polarizing filter, it is prevented from passing to the outside of the cell because the second polarizing filter is aligned perpendicularly to the direction of the first filter. The activated state of the cell is opaque and therefore creates a dark image.

The cell has been constructed with a variety of materials and cell gap distances. The preferred embodiment of the present invention is one where the cell gap is between 4 and 8 microns and the electrode surfaces are conditioned by rubbing in directions perpendicular to each other. Glass is used as the material for substrates 20 and 21. If the ratio of the natural pitch of the nematic liquid crystal material to the cell gap distance is between one and two, the liquid crystal material will assume the desired 270 degree twist. The desired tilt angle, $\Theta$, is less than 5 degrees, and as mentioned, is determined by the polymer coating selected. A suitable polyimide, used by the inventors to impart the alignment direction and desired tilt angle, is DuPont PI 2555.

The liquid crystal material ZLI-1957/5 from Merck (Darmstadt, Germany) has been used with the addition of the cholesteric material CB-15 as an additive. The CB-15 imparts a twist to the liquid crystal material in a right handed direction (when following the twist from the front or top substrate to the rear or bottom substrate). For a 6 micron cell gap, it is found that addition of 2% of the optically active additive CB-15 achieves the desired pitch. As mentioned, the electrode surfaces are conditioned to impart preferred directions which are perpendicular to each other. The liquid crystal material (with additive) is placed between the electrode surfaces, and the cell 1 is held apart by 6 micron spacers. When a voltage of 15 volts is applied across the electrodes, the cell 1 is observed to have an activation time of less than 1 msec. The decay response time when the voltage is 0 volts is observed to be 3 msec.

Figure 2:
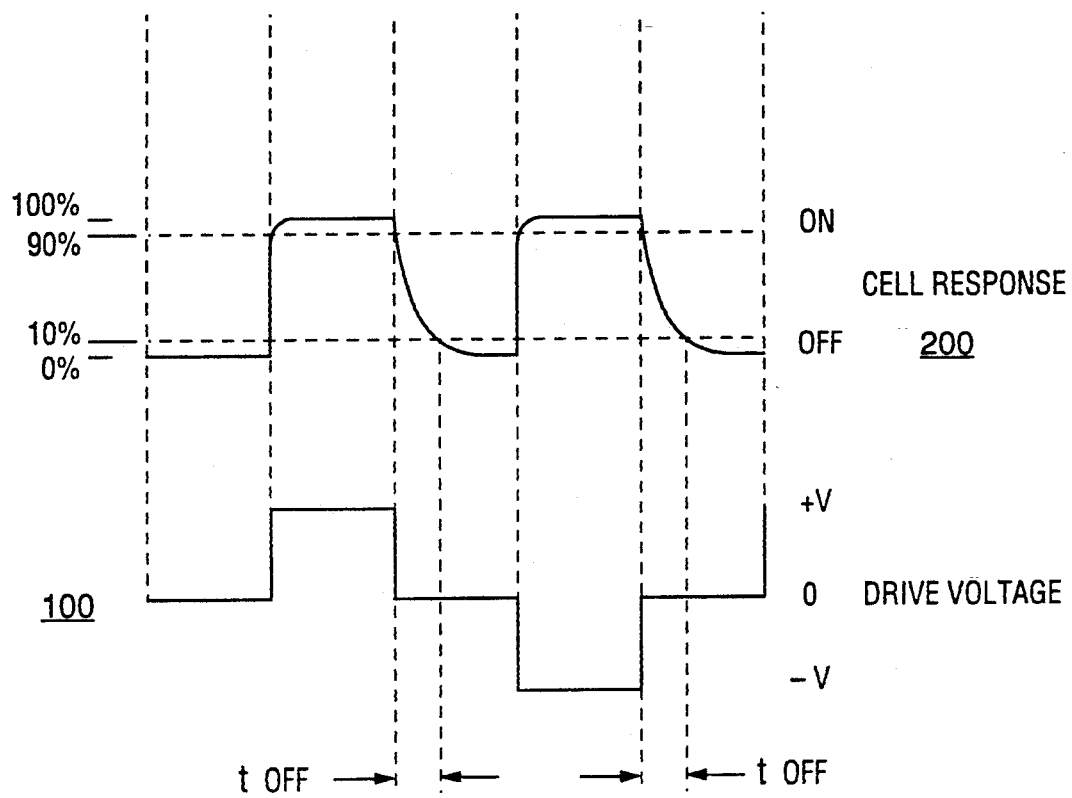
FIG. 2 shows a graph of the driving voltage and a graph of the cell response for a liquid crystal cell of the present invention.

The preferred characteristics of the AC voltage used to drive cell 1 (where AC is used to prevent electroplating) are shown in FIG. 2. The driving voltage has the following sequence of amplitudes: 0 volts, +15 volts, 0 volts, −15 volts, etc. The alternating sequence of positive and negative high voltages is used in order to reduce the build-up of charge on the electrodes. If desired, the high voltage can assume only positive (or negative) values, however, over the long term this can cause electroplating. FIG. 2 includes a graph 100 of the driving voltage along with a graph 200 of the cell response to such voltage. The cell response time is the length of time from the change of voltage states to when the cell achieves 90% of the total transition between states. The off response time is the length of time from the voltage change to achieving the 10% level of transition between states. The time-scale of graphs 100 and 200 can be understood by noting that the time between the vertical dotted lines (the amount of time the voltage is maintained at a constant value) is equal to 8 msec, and $t_{off}$ is equal to 3 msec.

Figure 3:
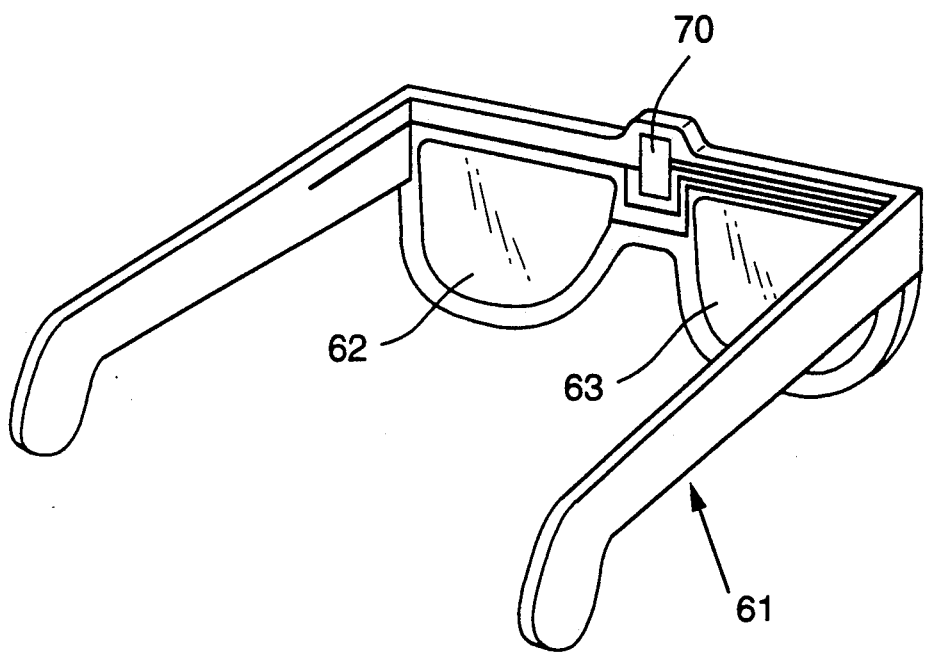
FIG. 3 shows eyewear incorporating the fast switching liquid crystal device of the present invention for use in a stereoscopic viewing system.

FIG. 3 shows eyewear 61 incorporating the fast switching liquid crystal device of the present invention for use in a stereoscopic viewing system. The eyewear 61 includes two identical liquid crystal shutter assemblies 62 and 63 which incorporate the device of the present invention. In most embodiments in which eyewear 61 receives a stereoscopic image, the shutter assemblies 62 and 63 are driven 180 degrees out phase with each other.

By driving shutter assemblies 62 and 63 substantially 180 degrees out of phase, consecutive, alternately polarized image fields of a field-sequential image generated by a stereoscopic image source (not shown) are displayed to the eyes of the person wearing eyewear 61. The driving of shutter assemblies 62 and 63 is achieved by means of a drive circuit 70 which operates in response to a synchronization signal received at a sensor mounted on eyewear 61 (the sensor can be incorporated within drive circuit 70).

The synchronization signal (which can be modulated infrared radiation) is provided by a transmitter associated with the stereoscopic image source, and causes the drive circuit to generate a drive signal in response to the synchronization signal so that the drive signal switches shutter assemblies 62 and 63 in synchronization with the field rate of the field-sequential image. A liquid crystal shutter system using such eyewear is described by Lipton et al., U.S. Pat. No. 4,967,268, issued Oct. 30, 1990.

While the present invention has been described with reference to the specific embodiment and elements disclosed, it is understood that other, equivalent embodiments of the invention are possible, and that the practice of the invention is not intended to be limited solely to the embodiments specifically disclosed in this application.

What is claimed is:
1. A fast switching liquid crystal device, comprising:
a pair of substantially parallel, transparent substrates, each of the substrates having an interior surface and an exterior surface, wherein the substrates are separated by a distance, thereby defining a gap between the substrates;
a transparent, conductive electrode deposited on the interior surface of each of the substrates, each of the electrodes having a surface in contact with the interior surface of each of the substrates and an interior surface facing away from the interior surface of each of the substrates, wherein the interior surface of each of the electrodes is conditioned to define a preferred direction, and further, wherein the preferred direction of one of the electrodes is substantially perpendicular to the preferred direction of the other of the electrodes;

a nematic liquid crystal material having a director axis, and contained within the gap, wherein the director axis at each of the electrodes is aligned with the preferred direction of each of the electrodes, and wherein the conditioning of the electrodes causes the director axis of the liquid crystal material to assume a tilt angle with respect to the interior surface of each of the electrodes;

an optically active additive mixed with the liquid crystal material in an amount sufficient to impart a pitch equal to between one and two times the gap, and to cause the liquid crystal material to assume a helical structure, wherein the helical structure of the liquid crystal material is such that it assumes a twist of 270 degrees in the transmissive off state, and further, wherein the tilt angle between the director axis of the liquid crystal material and the interior electrode surface is maintained along the helical structure of the liquid crystal material; and a polarizing filter arranged on the exterior surface of each of the substrates, wherein the polarizing filters have substantially perpendicular polarization axes and the polarizing axis of one of the polarizing filters is either substantially parallel or perpendicular to the direction of alignment of the director axis of the liquid crystal material at the interior surface of the electrode closest to that polarizing filter.

2. The device of claim 1, wherein the tilt angle between the director axis of the liquid crystal material and the interior surface of each of the electrodes is less than five degrees.

3. The device of claim 1, wherein the interior surfaces of the electrodes are conditioned by applying a polymer coating and rubbing the coating to impart a preferred direction to the surfaces.

4. The device of claim 1, wherein the substrates are glass.

5. The liquid crystal device of claim 1, further comprising:

a voltage source for supplying a driving voltage for the device, the driving voltage varying between a lower voltage and an upper voltage, the lower voltage having a magnitude below that which is sufficient to cause the liquid crystal material to achieve a 10% level of transitions between a transmissive and opaque state, and an upper voltage having a magnitude above that at which textured domains appear, thereby providing a sufficient contrast between the transmissive and opaque states.

6. A method of making a fast switching liquid crystal device having a lack of substantial textural nonuniformities, and a neutral colored, transmissive off state, and which does not require a bias voltage in the off state, the method comprising the steps of:

arranging a pair of substantially parallel, transparent substrates, each of the substrates having an interior surface and an exterior surface, wherein the substrates are separated by a distance, thereby defining a gap between the substrates;

forming a transparent, conductive electrode on the interior surface of each of the substrates, each of the electrodes having a surface in contact with the interior surface of each of the substrates and an interior surface facing away from the interior surface of each of the substrates, wherein the interior surface of each of the electrodes is conditioned to define a preferred direction, and further, wherein the preferred direction of one of the electrodes is substantially perpendicular to the preferred direction of the other of the electrodes;

inserting a nematic liquid crystal material having a director axis, the liquid crystal material being contained within the gap, wherein the director axis at each of the electrodes is aligned with the preferred direction of each of the electrodes, and wherein the conditioning of the electrodes causes the director axis of the liquid crystal material to assume a tilt angle with respect to the interior surface of each of the electrodes;

mixing an optically active additive with the liquid crystal material in an amount sufficient to impart a pitch equal to between one and two times the gap, and to cause the liquid crystal material to assume a helical structure, wherein the helical structure of the liquid crystal material is such that it assumes a twist of 270 degrees in the transmissive off state, and further, wherein the tilt angle between the director axis of the liquid crystal material and the interior electrode surface is maintained along the helical structure of the liquid crystal material; and arranging a polarizing filter on the exterior surface of each of the substrates, wherein the polarizing filters have substantially perpendicular polarization axes and the polarizing axis of one of the polarizing filters is either substantially parallel or perpendicular to the direction of alignment of the director axis of the liquid crystal material at the interior surface of the electrode closest to that polarizing filter.

7. The method of claim 6, wherein the tilt angle between the director axis of the liquid crystal material and the interior surface of each of the electrodes is less than five degrees.

8. The method of claim 6, wherein the interior surfaces of the electrodes are conditioned by applying a polymer coating and rubbing the polymer coating to impart a preferred direction to the surfaces.

9. The method of claim 6, wherein the substrates are glass.

10. The method of claim 6, further comprising:

applying a driving voltage source to the device, the driving voltage varying between a lower voltage and an upper voltage, the lower voltage having a magnitude below that which is sufficient to cause the liquid crystal material to achieve a 10% level of transitions between a transmissive and opaque state, and an upper voltage having a magnitude above that at which textured domains appear, thereby providing a sufficient contrast between the transmissive and opaque states.

11. A pair of eyewear for viewing a field-sequential stereoscopic display, comprising:

a frame;

a pair of fast switching liquid crystal shutter assemblies arranged in the frame, wherein each of the pair of shutter assemblies further comprises:

a pair of substantially parallel, transparent substrates, each of the substrates having an interior surface and an exterior surface, wherein the substrates are separated by a distance, thereby defining a gap between the substrates;

a transparent, conductive electrode deposited on the interior surface of each of the substrates, each of the electrodes having a surface in contact with the interior surface of each of the substrates and an interior surface facing away from the interior surface of each of the substrates, wherein the interior surface of each of the electrodes is conditioned to define a preferred direction, and further, wherein the preferred direction of one of the electrodes is substantially perpendicular to the preferred direction of the other of the electrodes;

a nematic liquid crystal material having a director axis, and contained within the gap, wherein the director axis at each of the electrodes is aligned with the preferred direction of each of the electrodes, and wherein the conditioning of the electrodes causes the director axis of the liquid crystal material to assume a tilt angle with respect to the interior surface of each of the electrodes;

an optically active additive mixed with the liquid crystal material in an amount sufficient to impart a pitch equal to between one and two times the gap, and to cause the liquid crystal material to assume a helical structure, wherein the helical structure of the liquid crystal material is such that it assumes a twist of 270 degrees in the transmissive off state, and further, wherein the tilt angle between the director axis of the liquid crystal material and the interior electrode surface is maintained along the helical structure of the liquid crystal material; and a polarizing filter arranged on the exterior surface of each of the substrates, wherein the polarizing filters have substantially perpendicular polarization axes and the polarizing axis of one of the polarizing filters is either substantially parallel or perpendicular to the direction of alignment of the director axis of the liquid crystal material at the interior surface of the electrode closest to that polarizing filter; and a means for driving the shutter assemblies, substantially 180 degrees out of phase with respect to each other, so that the shutter assemblies alternately enter a transmissive state.

12. The eyewear of claim 11, wherein the means for driving the shutter assemblies includes a sensor which receives a synchronization signal.

13. The eyewear of claim 12, wherein the tilt angle between the director axis of the liquid crystal material of the liquid crystal shutter assemblies and the interior surface of each of the electrodes is less than five degrees.

14. The eyewear of claim 11, wherein the interior surfaces of the electrodes of the liquid crystal shutter assemblies are conditioned by applying a polymer coating and rubbing the coating.

15. The eyewear of claim 11, wherein the substrates of the liquid crystal shutter assemblies are glass.

16. The eyewear of claim 11, wherein the means for driving the shutter assemblies includes a voltage source for supplying a driving voltage, the driving voltage varying between a lower voltage and an upper voltage, the lower voltage having a magnitude below that which is sufficient to cause the liquid crystal material to achieve a 10% level of transitions between a transmissive and opaque state, and an upper voltage having a magnitude above that at which textured domains appear, thereby providing a sufficient contrast between the transmissive and opaque states.

* * * * *